June 18, 1929.  H. M. WILLIAMS  1,717,643
DIE FOR PERMANENT MOLDINGS
Filed July 2, 1927
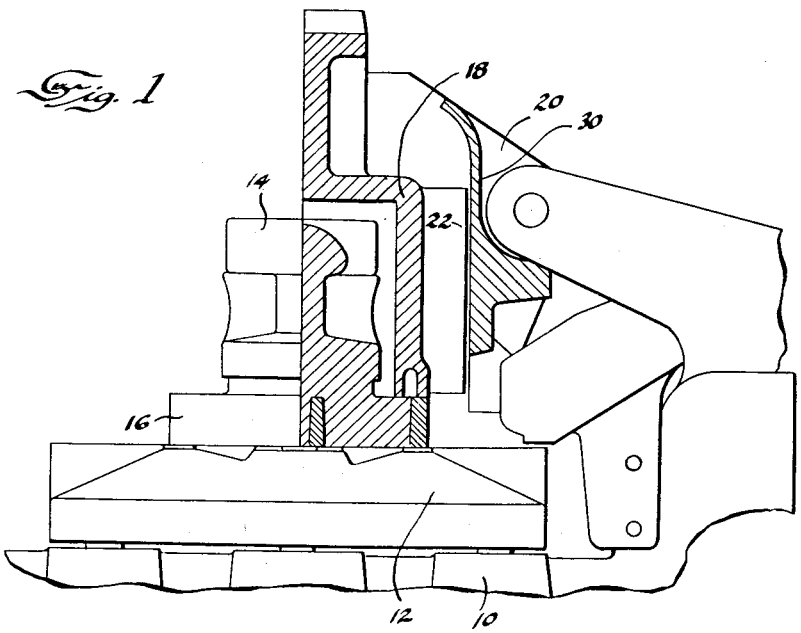
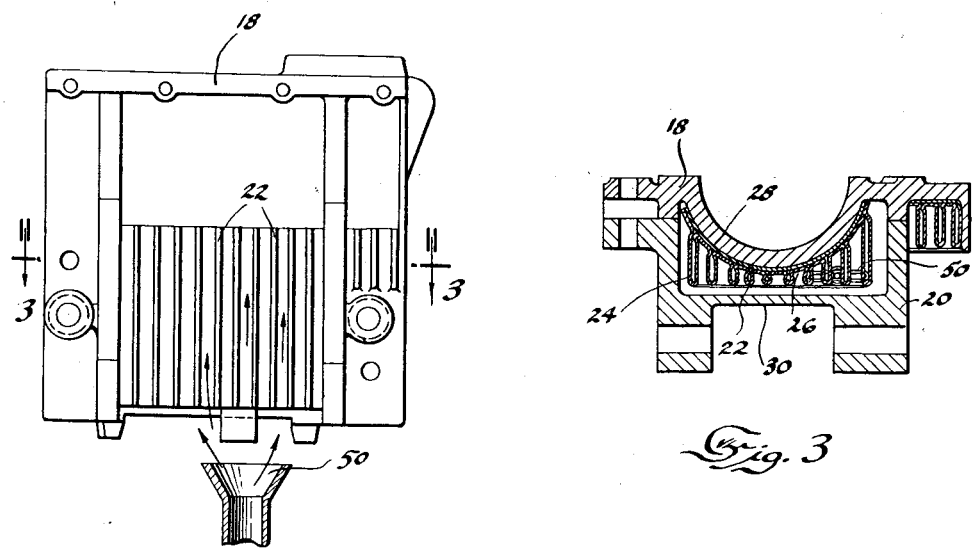
Fig. 1
Fig. 2
Fig. 3
Inventor
Harry M. Williams
By Blackmore, Spencer & Heidi
Attorneys Patented June 18, 1929.

1,717,643

UNITED STATES PATENT OFFICE.

HARRY M. WILLIAMS, OF DAYTON, OHIO, ASSIGNOR TO GENERAL MOTORS RESEARCH CORPORATION, OF DETROIT, MICHIGAN, A CORPORATION OF DELAWARE.

DIE FOR PERMANENT MOLDINGS.

Application filed July 2, 1927. Serial No. 203,205.

This invention relates to a casting apparatus for use in casting metals of relatively high melting points in permanent molds.

It is an object of this invention to dissipate rapidly from the mold the heat imparted to it by the molten metal poured into it. The object is attained by means of metallic molds having sheet metal heat dissipating elements composed of metal of high thermal conductivity cohesively bonded to the molds.

Other objects and advantages of the invention and the particulars of structure thereof will appear in the course of the following description, taken in connection with the accompanying drawing, and will be particularly pointed out in the appended claims.

In the drawing:

Figure 1 is an elevation, partly in section, of part of a hand operated casting apparatus.

Figure 2 is a rear view of one of the mold sections, with the mold holder removed and showing the arrangement of the radiating fins.

Figure 3 is a section on the line 3—3 of Figure 2, this view showing also a corresponding section of the mold holder.

Referring to the drawing, the numeral 10 indicates a table or frame on which is mounted the core supporting platform 12 for retaining the metallic base which supports the sand core 14. The numeral 18 indicates a mold section rigidly fixed to a mold holder 20. The present invention relates to a heat dissipating structure for the mold section. The drawing illustrates a casting apparatus of the type fully described in my co-pending application, Serial No. 116,571, filed June 17, 1926, to which reference may be had for further details. A detailed description of the mold carriers and their operating mechanism is not material to the present invention.

At 22 I have shown the heat dissipating fins, ordinarily but not necessarily constructed of copper, as silver, aluminum or other metals or an alloy of these may be used. In constructing the fins I prefer to use a sheet of pure copper, and in practice use sheet copper which is 99.85% pure. The sheet is crimped into the desired number of folds, each fold comprising a loop portion 24 and a base or base flange portion 26. The crimped sheet is then cleaned, preferably by dipping it in caustic soda, then in nitric acid, then by washing it, then dipping it in cyanide to neutralize the acid and washing it again in hot water. Any desired cleaning method may be used.

After the cleaning process, the under side of the bases 26 are evenly covered with a thin flux. For a flux I use one part by weight of borax, one part by weight of boric acid, and eight parts by weight of water. This is applied hot and allowed to dry.

The corresponding portion of the mold section 18 is given a clean smooth finish. This part of the mold section is then covered with a thin layer of flux as in the case of the bases 26 of the fin structure. A thin strip 28 of brazing brass or hard solder is then placed over the mold section as illustrated and the fin structure placed over it. I prefer to use a brazing solder which contains about 62% of copper. Silver solder may also be used. It is essential that the solder be a good conductor of heat and have a melting point below that of the copper fin structure. The solder used may be about seven one-thousands of an inch in thickness. The fin structure, sheet of solder and mold section are then fastened together.

The assembly is then ready for a second fluxing which consists in covering the exposed surfaces of the copper fins with a heavy flux. This coat is to prevent the fins from becoming brittle during the brazing operation following. For this heavy coat I prefer to use a flux of a mixture of borax and boric acid in equal parts diluted with water until the mixture has a specific gravity of about 1,300° at a temperature of 180° F. The flux should be carefully maintained at this temperature while being applied.

The assembly is then heated, preferably in an electric oven, as it is essential that the temperature be above that of the melting point of the solder and below that of the mold or the copper fins. The assembly may be slowly rotated while heating to insure that the solder will not run out.

While the brazing solder is in a fluid condition it alloys with the base of the copper fins and the mold section. After this heating, the mold is cooled and the flux removed in any suitable manner, as by the use of a suitable solvent and dipping in a nitric acid bath to remove discoloration.

Referring again to the drawing the mold holder 20 is provided with a central portion 30 which substantially covers the fin structure. I have illustrated a conventional widemouthed nozzle at 50 by means of which a cooling current of air may be maintained through the fin structure.

I have thus provided an efficient cooling arrangement for a permanent mold. The die portion of the mold section, or that part comprising the forming cavity, is uniform in cross-section so that heat will be conducted uniformly to the fins.

The union of the copper fins and the mold section is complete and uniform. Between the mold section and the brazing solder and between the brazing solder and the fins are zones of alloy or intermixture so that a coherent bond exists. True thermal contact is thus provided between the body of the mold section and the fins so that heat is conducted rapidly from the body of the mold section to the fins where it is carried away by the cooling blast of air from the cooling nozzle 50.

While I have described in considerable detail the process of connecting the fins to the mold section, I desire it to be understood that other processes may be used to attain this result and that my invention resides in the mold which has been constructed in the form indicated. In use the inner surface of the mold is ordinarily provided with a coating as is well known in the art.

In the operation of the device the mold sections are moved to operating position and the molten metal poured in. The heat of the molten metal is conducted to the fin structure where it is dissipated by a current of air from the nozzle 50. This current of air of course passes both within and without each loop 24, a large radiating surface being thus provided.

I claim:

1. In a permanent mold, a mold section of ferrous metal, heat-dissipating elements bonded integrally therewith and comprising thin radiating sheets of metal of high heat conductivity, adjacent sheets being connected by a layer of the same metal.

2. In a permanent mold, a mold section, a heat-dissipating element for said section comprising a thin sheet of metal of high heat conductivity, bent to form loops, the base portion of each loop being bonded integrally with said mold section.

3. In a permanent mold and in combination, a metallic mold section, sheet metal heat-dissipating elements thereon of high heat conductivity, said heat-dissipating elements being bonded integrally to said mold section by an uninterrupted layer of bonding metal cohering to said mold section and to said elements and providing an uninterrupted molecular path for conducting heat from said mold section to said elements.

4. In a permanent mold and in combination, a mold section comprising ferrous material, sheet-copper heat-dissipating elements thereon, said heat-dissipating elements being bonded integrally to said mold section by an uninterrupted layer of bonding metal cohering to said mold section and to said elements and providing an uninterrupted molecular path for conducting heat from said mold section to said elements.

5. In a permanent mold, and in combination, a mold section, sheet-metal heat-dissipating elements projecting from said mold section, said heat-dissipating elements having base flanges arranged side by side, so that said base flanges substantially cover the surface of said mold section from which said heat-dissipating elements project, and an uninterrupted layer of bonding metal cohering to said mold section and to said elements and providing an uninterrupted molecular path for conducting heat from said mold section to said elements.

6. In a permanent mold, and in combination, a mold section, heat-dissipating elements bonded thereto, said heat dissipating elements comprising a series of radiating fins forming parts of a continuous sheet of metal, said fins being joined by portions of said sheet constituting base flanges in contact with said mold section, said base flanges lying in substantial contact with each other.

7. In a permanent mold and in combination, a mold section, heat-dissipating elements bonded thereto, said heat-dissipating elements comprising a series of radiating loops forming parts of a continuous sheet of metal, said loops being joined by portions of said sheet constituting base flanges in contact with said mold section, said base flanges being in substantial contact with each other.

8. In a permanent mold and in combination, a mold section, heat-dissipating elements bonded thereto, said heat dissipating elements comprising a series of radiating fins forming parts of a continuous sheet of metal, said fins being joined by portions of said sheet constituting base flanges in contact with said mold section, said base flanges lying in substantial contact with each other and being integrally connected with an interposed layer of metal cohering to said flanges and providing an uninterrupted molecular path for conducting heat from one flange to the other.

9. In a permanent mold and in combination, a mold section comprising ferrous metal, copper heat-dissipating elements bonded thereto, said heat-dissipating elements comprising a series of radiating fins forming parts of a continuous sheet of copper, said fins being joined by portions of said sheet constituting base flanges in contact with said mold section, said flanges being integrally connected by an interposed layer of metal cohering to said flanges and providing an uninterrupted molecular path for conducting heat from one flange to another.

10. In a permanent mold and in combination, a cylindrical mold section and a plurality of heat-dissipating loops bonded thereto, said loops extending parallel with the axis of said body and being connected together by a plurality of bases, the combined area of said bases being substantially equal to the peripheral area of that portion of the cylindrical mold section to which the heat-dissipating loops are bonded.

11. In a permanent mold and in combination, a ferrous mold section of substantially uniform section, heat-dissipating elements uniformly spaced on the outer surface of said mold section, said heat-dissipating elements being made of non-ferrous metal, having greater heat conductivity than the mold section, said heat-dissipating elements being formed of a thin sheet bent in loops, said sheet being bonded to the mold section by a progressive alloying with an intermediate metal of high conductivity so as to provide a progressive alloying of the mold section with the bond and of the bond with the heat-dissipating elements, thereby providing an uninterrupted molecular path for the conduction of heat from the mold section to the heat-dissipating elements.

12. A permanent mold provided with an outer wall comprising inner and outer wall sections, said sections being spaced to provide a passage between them, heat radiating fins secured to the inner wall section, and projecting into said space so as to be in the line of draft through said passage.

13. In the combination as defined in claim 12, said fins being of tubular cross section.

In testimony whereof I affix my signature.

HARRY M. WILLIAMS.